US006196576B1

(12) United States Patent
Sutherland et al.

(10) Patent No.: US 6,196,576 B1
(45) Date of Patent: Mar. 6, 2001

(54) VEHICLE OCCUPANT RESTRAINT APPARATUS

(75) Inventors: Daniel R. Sutherland, Sterling Heights; Paul A. Bowers, Ray, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/133,296

(22) Filed: Aug. 12, 1998

(51) Int. Cl.$^7$ .................................................. B60R 21/22
(52) U.S. Cl. ......................................... 280/730.1; 280/751
(58) Field of Search ............................... 280/730.1, 730.2, 280/751, 752, 753; 297/216.12, 216.13, 216.14

(56) References Cited

U.S. PATENT DOCUMENTS

| 3,397,911 | 8/1968 | Brosius, Sr. . | |
|---|---|---|---|
| 3,510,150 | 5/1970 | Wilfert . | |
| 3,603,535 | 9/1971 | DePolo . | |
| 3,655,217 | 4/1972 | Johnson . | |
| 3,703,313 | 11/1972 | Schiesterl et al. . | |
| 3,779,577 | 12/1973 | Wilfert . | |
| 4,655,505 | 4/1987 | Kashiwamura et al. . | |
| 5,054,845 | * 10/1991 | Vogel | 297/216 |
| 5,348,342 | * 9/1994 | Halland et al. | 280/730 A |
| 5,505,486 | 4/1996 | Ahn . | |
| 5,669,661 | * 9/1997 | Pajon | 297/216.13 |
| 5,738,407 | 4/1998 | Locke . | |
| 5,775,726 | * 7/1998 | Timothy et al. | 280/730.1 |
| 5,782,529 | * 7/1998 | Miller, III et al. | 297/216.13 |
| 5,833,312 | * 11/1998 | Lenz | 280/730.1 |
| 5,902,010 | * 5/1999 | Cuevas | 297/216.13 |
| 5,904,370 | * 5/1999 | Steiner et al. | 280/743.1 |
| 5,924,724 | * 7/1999 | Nakamura et al. | 280/730.2 |
| 5,975,565 | * 11/1999 | Cuevas | 280/730.1 |

FOREIGN PATENT DOCUMENTS

| 2841729 | 4/1980 | (DE) . | |
|---|---|---|---|
| 29601798 U | 7/1996 | (DE) . | |
| 19742876 | 3/1999 | (DE) . | |
| 19756427 | 6/1999 | (DE) . | |
| 19800078 | 7/1999 | (DE) . | |
| 19937678 | 3/2000 | (DE) . | |
| 1314645 | * 12/1989 | (JP) | 280/730 R |

* cited by examiner

Primary Examiner—Brian L. Johnson
Assistant Examiner—Gerald Klebe
(74) Attorney, Agent, or Firm—Tarolli, Sundheim, Covell, Tummino & Szabo L.L.P.

(57) ABSTRACT

An apparatus (10) includes a vehicle seat (12) having a cover (32) which is extendible from an initial condition to an extended condition for restraining an occupant of the seat (12). The seat (12) has a first volume enclosed by the cover (32) when the cover (32) is in the initial condition. The seat (12) has a second, greater volume enclosed by the cover (32) when the cover (32) is in the extended condition. The second enclosed volume of the seat (12) is greater than the first enclosed volume sufficient for enlargement of the seat (12) from the first enclosed volume to the second enclosed volume to enhance the degree to which the seat (12) can restrain movement of a seated vehicle occupant under the influence of vehicle crash forces. An inflatable vehicle occupant protection device (18) is supported on the seat (12). The protection device (18) is movable against the cover (32) so as to extend the cover (32) from the initial condition to the extended condition upon inflation of the protection device (18) from a stored condition to a fully deployed condition.

14 Claims, 3 Drawing Sheets

VEHICLE OCCUPANT RESTRAINT APPARATUS

FIELD OF THE INVENTION

The present relates to an apparatus for restraining an occupant of a vehicle seat upon the occurrence of a vehicle crash.

BACKGROUND OF THE INVENTION

A vehicle crash may cause an occupant of a vehicle seat to move in a rearward direction relative to the seat. Therefore, a vehicle seat typically is equipped with a vehicle occupant protection device, such as a headrest and/or an inflatable device, for restraining rearward movement of a seated occupant's head and neck.

SUMMARY OF THE INVENTION

In accordance with the present invention, an apparatus comprises a vehicle seat having a cover which is extendible from an initial condition to an extended condition for restraining an occupant of the seat. The seat has a first volume enclosed by the cover when the cover is in the initial condition. The seat has a second, greater volume enclosed by the cover when the cover is in the extended condition. The second enclosed volume of the seat is greater than the first enclosed volume sufficiently for enlargement of the seat from the first enclosed volume to the second enclosed volume to enhance the degree to which the seat can restrain movement of a seated vehicle occupant under the influence of vehicle crash forces. An inflatable vehicle occupant protection device is supported on the seat. The protection device is movable against the cover so as to extend the cover from the initial condition to the extended condition upon inflation of the protection device from a stored condition to a fully deployed condition.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF PREFERRED EMBODIMENTS

Figure 1:
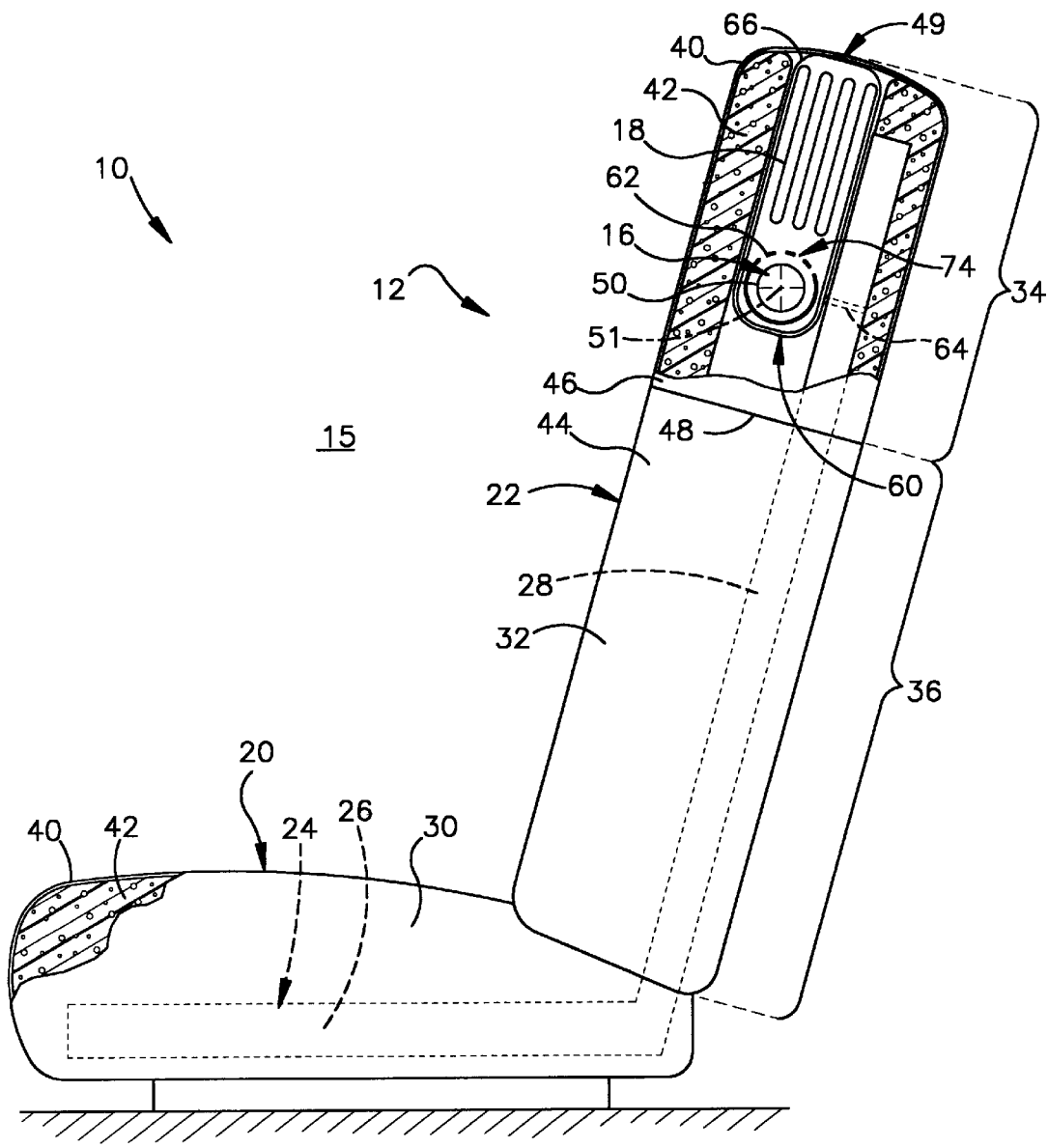
FIG. 1 is a side view of parts of an apparatus comprising a first embodiment of the present invention, with certain parts being shown schematically.

An apparatus 10 comprising a first embodiment of the present invention is shown in FIG. 1. The apparatus 10 includes a vehicle seat 12 in a vehicle occupant compartment 15. The apparatus 10 further includes an inflator 16 and a particular type of inflatable vehicle occupant protection device 18 which is known as an air bag.

The seat 12 comprises a seat bottom 20 and a seat back 22. More specifically, the seat 12 has a frame 24 with a bottom portion 26 and a back portion 28. The seat bottom 20 is defined in part by the bottom portion 26 of the frame 24 and in part by a bottom cover 30 that covers the bottom portion 26 of the frame 24. The seat back 22 is defined in part by the back portion 28 of the frame 24 and in part by a back cover 32 that covers the back portion 28 of the frame 24.

In the first embodiment of the present invention the seat 12 is a "uni-back" type of seat. The seat back 22 thus has a headrest portion 34 and a torso-support portion 36, with the back cover 32 extending over both the headrest and torso-support portions 34 and 36 of the seat back 22.

Each of the seat covers 30 and 32 is a deflectable structure comprising an outer layer 40 on a compressible base 42. The outer layer 40 of the bottom cover 30 is preferably formed of fabric or leather. The outer layer 40 of the back cover 32 has a torso portion 44 which is preferably formed of the same fabric or leather. The outer layer 40 of the back cover 32 further has a headrest portion 46 which, as described more fully below, is formed of an elastically stretchable fabric. A seam 48 joins the headrest portion 46 to the torso portion 44 fully around the periphery of the seat back 22. The seam 48 can be formed by stitches, ultrasonic welds, adhesives, heat staking, or the like, depending on the particular materials of which the two portions 44 and 46 of the outer layer 40 are formed.

The bases 42 of the seat covers 30 and 32 are preferably formed of elastomeric foam. A gap 49 extends through the base 42 of the back cover 32 at the upper end of the headrest 34. The headrest portion 46 of the outer layer 40 extends over the gap 49.

The inflator 16 and the air bag 18 are mounted in the seat back 22 on the back portion 28 of the frame 24, and are covered by the back cover 32. As shown schematically in the drawings, the inflator 16 has an elongated cylindrical housing 50 with a longitudinal central axis 51. The housing 50 contains a source of inflation fluid for inflating the air bag 18. The housing 50 may thus contain pressurized inflation fluid, a body of ignitable gas generating material, or a combination of pressurized inflation fluid and ignitable material for heating the inflation fluid, as known in the art.

The air bag 18, which also is shown schematically in the drawings, is constructed of one or more panels of a known air bag material. Such materials include woven materials and plastic films. The panels of air bag material are interconnected along seams (not shown). Like the seam 48 in the back cover 32, the seams in the air bag 18 can be formed by stitches, ultrasonic welds, adhesives, heat staking, or the like, depending on the particular air bag material of which the panels are formed. Preferably, the air bag 18 is constructed of panels formed of nylon fabric which is coated with silicone. Any suitable arrangement of folds can be used to place the air bag 18 in the folded, stored condition in which it is shown in FIG. 1.

The inflator 16 and the air bag 18 in the first embodiment of the invention are parts of an air bag module 60 which is assembled separately from the seat frame 24. Other parts of the module 60 include a diffuser 62 and a plurality of fasteners 64 (one of which is shown in FIG. 1). The inflator 16 is received within the diffuser 62. The fasteners 64 project from the diffuser 62 to the back portion 28 of the frame 24 to fasten the module 60 to the back portion 28 of the frame 24. A rupturable plastic module cover 66 encloses the air bag 18, the diffuser 62, and the inflator 16.

Figure 2:
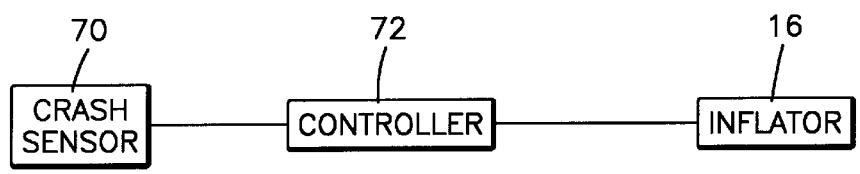
FIG. 2 is a block diagram of parts of the apparatus of FIG. 1.

As shown schematically in FIG. 2, the inflator 16 is operatively interconnected with a crash sensor 70 and an electronic controller 72. The crash sensor 70 is a known device that sense vehicle conditions indicating the occurrence of a crash. The conditions sensed by the crash sensor 70 preferably comprise conditions that indicate the occurrence of a rear impact crash. Such a crash-indicating condition may meet or exceed a predetermined threshold level of severity. If so, the controller 72 responds by actuating the inflator 16. The inflator 16 then emits a large quantity of inflation fluid. Outlet openings 74 in the diffuser 62 direct the inflation fluid to flow from the inflator to the air bag 18 to inflate the air bag 18.

The air bag 18 and the outlet openings 74 in the diffuser 62 are oriented such that the inflation fluid deploys the air upward toward the gap 49 in the foam base 42 at the upper end of the headrest 34. Accordingly, the inflation fluid pressure forces acting on the air bag 18 first rupture the module cover 66 beneath the gap 49, and then move the air bag 18 upward through the gap 49. The air bag 18 is thus deployed from the folded, stored condition of FIG. 1 to the unfolded, fully deployed condition of FIG. 3.

As noted above, the outer layer 40 of the back cover 32 has a headrest portion 46 which is formed of an elastically stretchable fabric. When the air bag 18 is deployed in the foregoing manner, it moves against the headrest portion 46 of the outer layer 40 above the gap 49 and stretches the headrest portion 46 from the initial condition of FIG. 1 to the extended condition of FIG. 3. This enlarges the enclosed volume of the headrest 34 sufficiently to enhance the degree to which the headrest 34 can restrain rearward movement of a seated occupant's head and neck. Importantly, the headrest 34 in the first embodiment of the invention is extended vertically to enhance the degree to which it can restrain rearward movement of the occupant's head and neck if vehicle crash forces cause the occupant to slide upward along the seat back 22.

Figure 3:
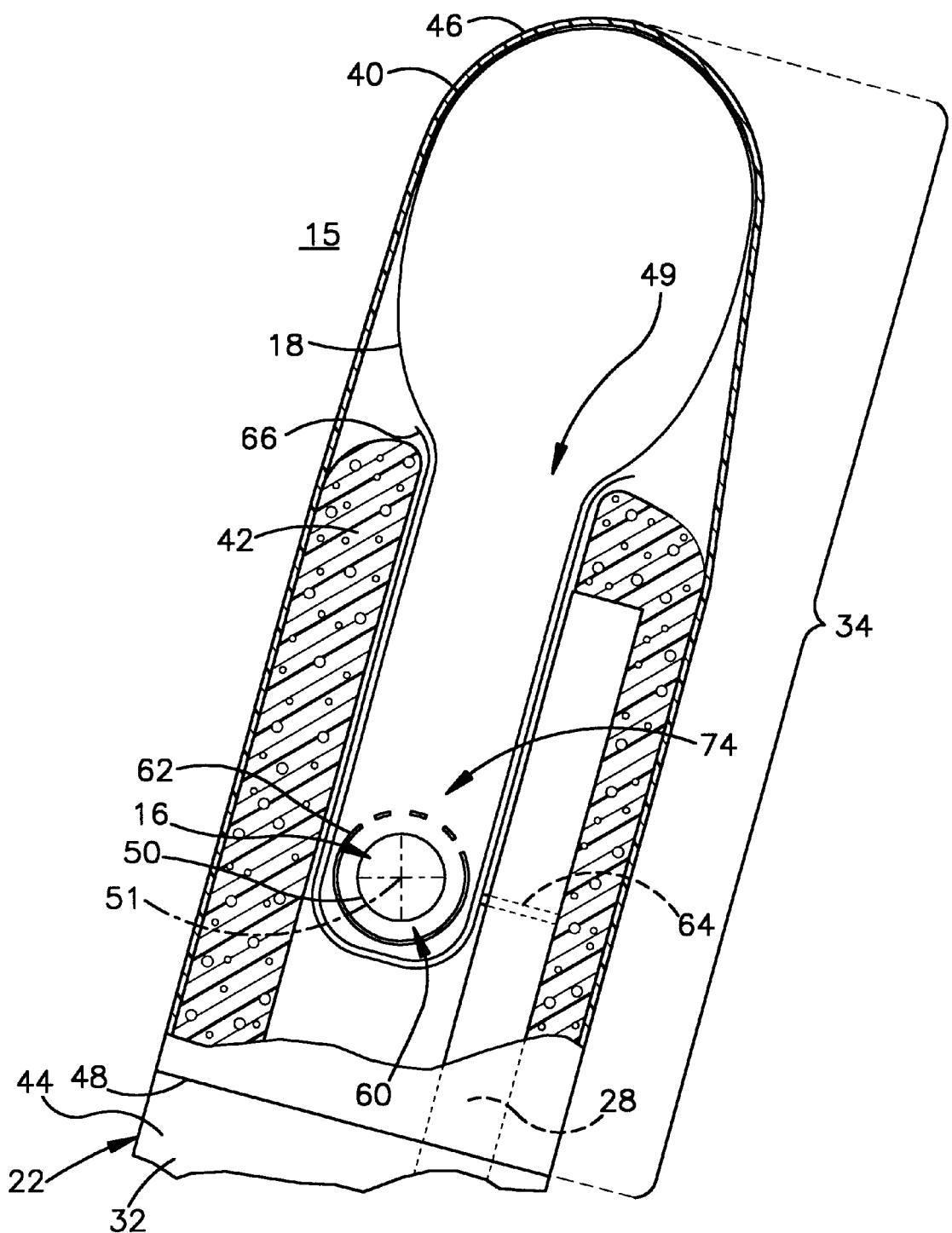
FIG. 3 is an enlarged partial view of parts shown in FIG. 1, with certain parts being shown in different positions.

In accordance with a particular feature of the back cover 32, the headrest portion 46 of the outer layer 40 is extendible enough to reach the condition of FIG. 3 without being torn open by the inflation fluid pressure forces applied by the inflating air bag 18. This enables the outer layer 40 to envelop and enclose the air bag 18 within the enlarged headrest 34 when the air bag 18 reaches the fully deployed condition of FIG. 3. Further in accordance with this feature of the invention, the headrest portion 46 of the outer layer 40 is sufficiently elastic to contract to the initial condition of FIG. 1 for re-use on the seat back 22 after the air bag 18 has been inflated. The air bag 18 also could be elastically stretchable and contractible sufficiently to be re-usable in the seat 12.

Figure 4:
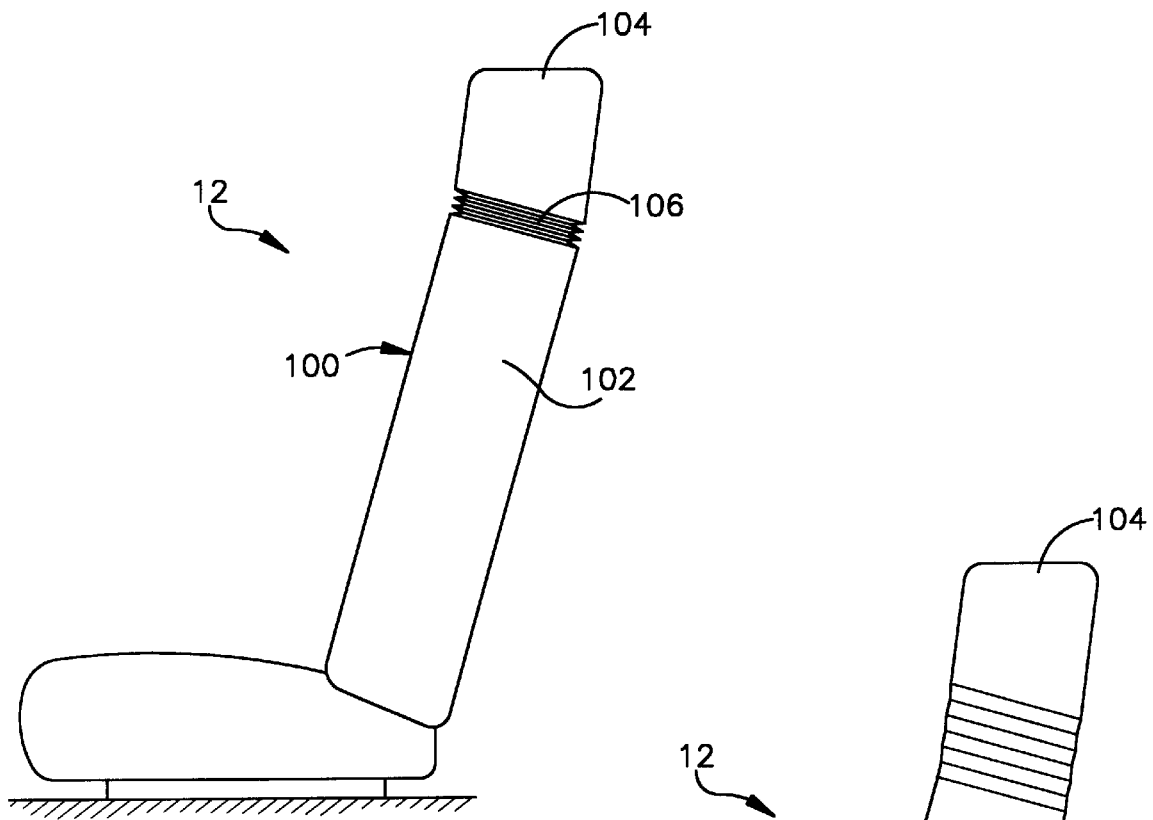
FIG. 4 is a side view of parts of an apparatus comprising a second embodiment of the present invention.
Figure 5:
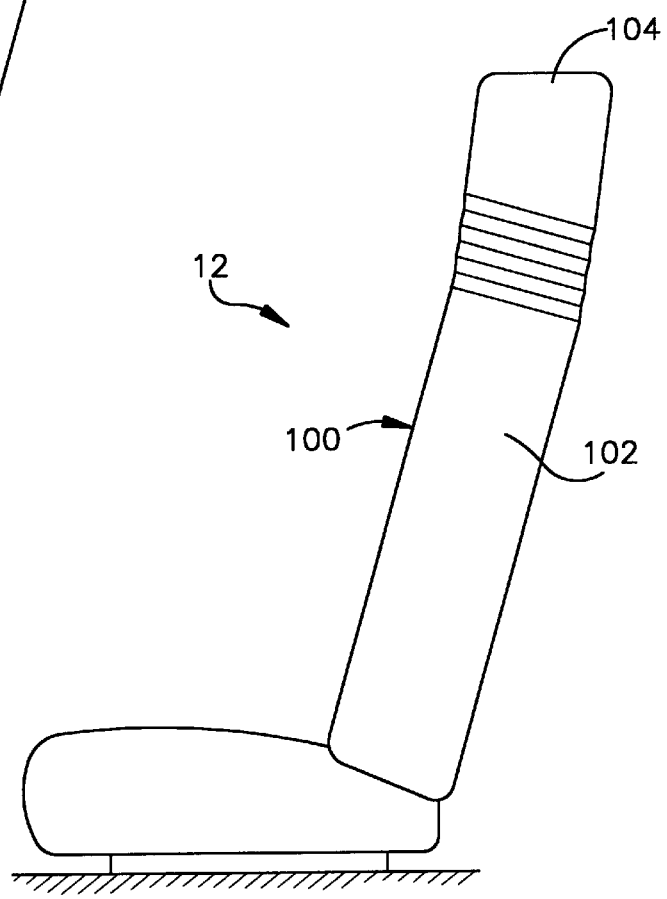
FIG. 5 is a view similar to Fig, 4 showing parts in different positions.

An apparatus comprising a second embodiment of the present invention is shown in FIGS. 4 and 5. In the second embodiment, the seat 12 has an alternative back cover 100 in place of the back cover 32 described above. The apparatus is otherwise the same as the apparatus 10.

Like the back cover 32 described above, the alternative back cover 100 has a torso-support portion 102 and a headrest portion 104. However, the two portions 102 and 104 of the back cover 100 are formed of the same material. A plurality of accordion folds 106 are formed in that material at the juncture of the two portions 102 and 104 of the back cover 100. The accordion folds 106 enable the back cover 100 to be extended from the folded, initial condition of FIG. 4 to the unfolded, vertically extended condition of FIG. 5 without stretching significantly. The back cover 100 can then be re-folded for re-use in the condition of FIG. 4.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a vehicle seat having a cover extendible from an initial condition to an extended condition;
   said seat having a first volume enclosed by said cover when said cover is in said initial condition and having a second, greater volume enclosed by said cover when said cover is in said extended condition, said second enclosed volume being greater than said first enclosed volume sufficiently for enlargement of said seat from said first enclosed volume to said second enclosed volume to enhance the degree to which said seat can restrain movement of a seated vehicle occupant under the influence of vehicle crash forces; and
   an inflatable vehicle occupant protection device supported on said seat for movement against said cover so as to extend said cover from said initial condition to said extended condition upon inflation of said protection device from a stored condition to a fully deployed condition.

2. Apparatus as defined in claim 1 further comprising an inflator which is actuatable to emit inflation fluid which inflates said protection device, and means for sensing and responding to a vehicle crash by actuating said inflator.

3. Apparatus as defined in claim 1 wherein said cover comprises an outer layer on a compressible base, said base having a gap through which said protection device is movable against said outer layer upon said inflation of said protection device.

4. Apparatus as defined in claim 1 wherein said cover is stretchable upon being extended from said initial condition to said extended condition and is sufficiently elastic to contract for re-use in said initial condition.

5. Apparatus comprising:
   a vehicle seat including a seat cover; and
   an inflatable vehicle occupant protection device supported on said seat in a folded, stored condition;
   said protection device being movable against said cover upon inflation of said protection device to an unfolded, fully deployed condition;
   said cover being extendible by said protection device so as to envelop said protection device when said protection device is in said fully deployed condition.

6. Apparatus as defined in claim 5 wherein said cover has an initial condition when said protection device is in said stored condition and has a stretched condition when said protection device is in said fully deployed condition, said cover being sufficiently elastic to contract from said stretched condition to said initial condition for re-use after inflation of said protection device.

7. Apparatus comprising:
   a vehicle seat having a cover extendible from an initial condition to an extended condition;
   said seat having a first volume enclosed by said cover when said cover is in said initial condition and having a second, greater volume enclosed by said cover when said cover is in said extended condition, said second enclosed volume being greater than said first enclosed volume sufficiently for enlargement of said seat from said first enclosed volume to said second enclosed volume to enhance the degree to which said seat can restrain movement of a seated vehicle occupant under the influence of vehicle crash forces; and an inflatable vehicle occupant protection device supported on said seat for movement against said cover so as to extend said cover from said initial condition to said extended condition upon inflation of said protection device from a stored condition to a fully deployed condition, said cover is folded when in said initial condition and is unfolded upon being extended to said extended condition.

8. Apparatus as defined in claim 7 wherein said cover is re-foldable from said extended condition for re-use in said initial condition.

9. Apparatus comprising:

a vehicle seat having a cover extendible from an initial condition to an extended condition;

said seat having a first volume enclosed by said cover when said cover is in said initial condition and having a second, greater volume enclosed by said cover when said cover is in said extended condition, said second enclosed volume being greater than said first enclosed volume sufficiently for enlargement of said seat from said first enclosed volume to said second enclosed volume to enhance the degree to which said seat can restrain movement of a seated vehicle occupant under the influence of vehicle crash forces; and an inflatable vehicle occupant protection device supported on said seat for movement against said cover so as to extend said cover from said initial condition to said extended condition upon inflation of said protection device from a stored condition to a fully deployed condition, said cover extending over a headrest portion of said seat, said protection device being supported for movement against said cover at said headrest portion of said seat so as to extend said headrest portion vertically upon extending said cover from said initial condition to said extended condition.

10. Apparatus as defined in claim 9 wherein said seat has a torso support portion beneath said headrest portion, said cover extending over both said headrest and torso support portions of said seat.

11. Apparatus comprising:

a vehicle seat including a seat cover; and an inflatable vehicle occupant protection device supported on said seat in a folded, stored condition;

said protection device being movable against said cover upon inflation of said protection device to an unfolded, fully deployed condition;

said cover being extendible by said protection device when said protection device is in said fully deployed condition, said cover has a folded condition prior to being extended by said protection device and is unfolded upon being extended by said protection device.

12. Apparatus as defined in claim 11 wherein said cover is re-foldable to said folded condition for re-use after being extended by said protection device.

13. Apparatus comprising:

a vehicle seat including a seat cover; and an inflatable vehicle occupant protection device supported on said seat in a folded, stored condition;

said protection device being movable against said cover upon inflation of said protection device to an unfolded, fully deployed condition;

said cover being extendible by said protection device when said protection device is in said fully deployed condition, said cover extending over a headrest portion of said seat, said protection device being supported for movement against said cover at said headrest portion of said seat so as to extend said headrest portion vertically upon inflation of said protection device to said fully deployed condition.

14. Apparatus as defined in claim 13 wherein said seat has a torso support beneath said headrest portion, said cover extending over both said headrest and torso support portions of said seat.

* * * * *